United States Patent [19]

Mezei

[11] Patent Number: 5,303,323

[45] Date of Patent: Apr. 12, 1994

[54] METHOD AND APPARATUS FOR MAKING ARBITRARILY SHAPED FIBER OPTIC BACKLIGHTING SUBSTRATES

[75] Inventor: George A. Mezei, Huntington Beach, Calif.

[73] Assignee: Poly-Optical Products, Inc., Irvine, Calif.

[21] Appl. No.: 961,737

[22] Filed: Oct. 16, 1992

[51] Int. Cl.⁵ ............................................. G02B 6/04
[52] U.S. Cl. .................... 385/147; 156/296; 156/174; 242/18 G; 242/159; 385/115; 359/900
[58] Field of Search ................ 242/18 G, 178, 159; 359/900; 156/296, 166, 174; 362/32; 385/147, 115, 121, 116, 117, 118, 119, 120, 901

[56] References Cited

U.S. PATENT DOCUMENTS 3,989,578  11/1976  Hashimoto ............... 242/18 G
5,156,347  10/1992  Gay, II et al. ............ 242/18 G
5,204,927   4/1993  Chin et al. ................ 385/115

Primary Examiner—Rodney B. Bovernick
Assistant Examiner—John Ngo
Attorney, Agent, or Firm—Robbins, Berliner & Carson

[57] ABSTRACT

Fiber optic backlighting substrates having a predetermined shape are manufactured by a special rotating fixture having a deep, narrow peripheral groove in which several windings of the fiber may be stacked on top of one another, to provide a closely packed spiral array having a thickness on the order of one fiber diameter and a radial extent equal to several times the diameter of a single fiber thick and several fibers wide. At least one wall of the groove is preferably hinged or otherwise removable, to provide convenient access to the spiral and to permit it to be removed from the fixture, whereupon the spiral may be cut radially to form a fiber optic substrate comprising a flat array of closely packed curved fibers, from which extends one or more bundles of loose fibers. By providing a cam-shaped groove having a non-constant depth relative to the rotational axis of the fixture, fiber arrays having segments of varying radii may be fabricated.

9 Claims, 3 Drawing Sheets

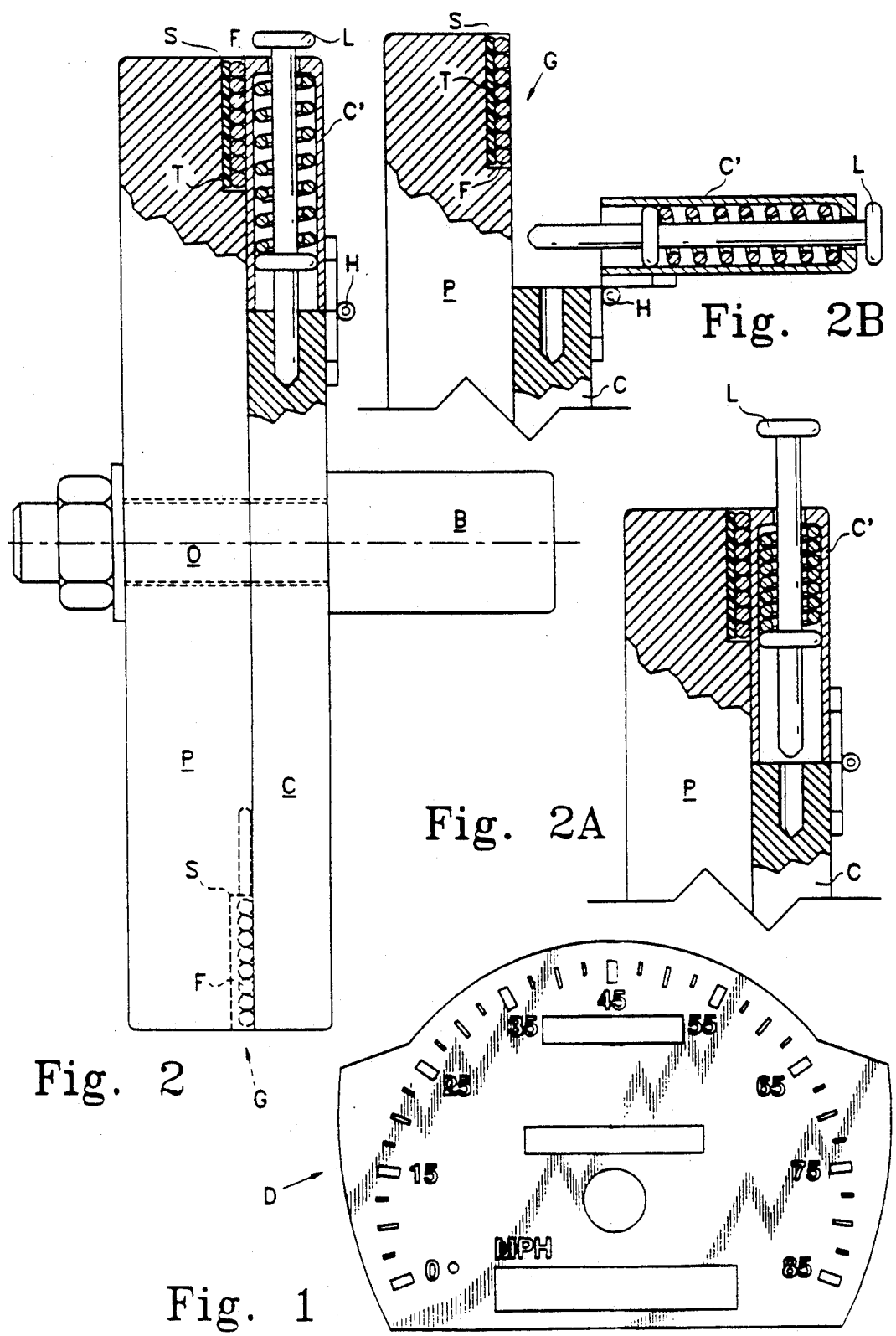

5,303,323

METHOD AND APPARATUS FOR MAKING ARBITRARILY SHAPED FIBER OPTIC BACKLIGHTING SUBSTRATES

FIELD OF THE INVENTION

The present invention relates generally to the illumination of optical displays. More specifically, the present invention relates to a method for fabricating a substrate of curved optical fibers to provide uniform background illumination over an arbitrarily shaped area.

BACKGROUND OF THE INVENTION

Fiber optic backlighting panels are commonly used to illuminate a high contrast image that is visible even under poor ambient light.

Typically, such prior backlighting devices utilize a plurality of optical fibers, each having a core surrounded by cladding, which are placed adjacent one another above an optically reflecting surface. Light is beamed into the optical fibers from a light source, such as a lamp. The light is propagated in the core of the optical fiber by means of partial internal refraction, and exits at one or more discontinuities in the fiber, providing local illumination in the region of the discontinuity.

In the past, such fiber optic backlighting devices have been manufactured from fiber optic substrates comprising one or more optical fibers grouped together in a rectangular ribbon or panel substrate configuration. Typically, the ribbon or panel substrate is about 0.01 to 0.03 thick. By deforming (for example, by a heated die) or machining (for example, by a computer-controlled laser beam) at least one surface of the substrate, local discontinuities are formed in at least some of the fibers at which some or all of the light introduced into one or both ends of the fiber will exit. Such illumination may be utilized for backlighting a variety of displays.

Analog indicators in automotive and other applications, such as speedometers, fuel level indicators, dial gauges, and the like, are traditionally arranged in the form of a circular annulus, or an angular segment of an annulus. In theory, such indicators can be backlit with one or more rectangular panels covering the entire area. However, backlighting the entire area of an annular indicator is inefficient and interferes with the use of the area in the middle or the corners of the display for other devices and mechanisms, such as a self-contained digital readout.

For such applications, it is thus desirable to use fiber optic illumination ribbons and panels having a curved shape. To date such curved shapes have been laid up one strand at a time, using a flat template defining the desired shape. Thus a need exists for a method and apparatus for the mass production of arrays of optical fibers that is not limited to rectangular panels and ribbons.

SUMMARY OF THE INVENTION

In accordance with the present invention, fiber optic backlighting substrates are manufactured by means of a special fixture providing a confined space in which several windings of the fiber may be laid on top of one another, to form a closely packed spiral array having a thickness on the order of one fiber diameter and a radial extent equal to several times the diameter. Preferably, the space is defined by a peripheral groove in a rotating fixture having a depth at least equal to the radial extent of the spiral and a width slightly greater than the desired thickness of the completed array; at least one wall of the groove is preferably hinged or otherwise removable, to provide convenient access to the spiral and to permit it to be removed from the fixture, whereupon the spiral may be cut radially to form a non-rectangular fiber optic substrate comprising a flat array of closely packed curved fibers, from which extends one or more bundles of loose fibers. The resultant array of fibers will henceforth be referred to as an "annulus" or an "annular segment", although it should be understood that its shape is determined at least in part by the radial profile of the groove, and is typically bounded by a concentric pair of similar curves (such as corresponding segments of circles, ellipses, or ovals) which may be extended by one or more straight or curved sections.

Thus, by providing a cam-shaped peripheral groove having a non-constant depth relative to the rotational axis of the fixture, curved fiber arrays having annular segments of varying radii may be fabricated.

Preferably, one lateral wall of the groove is lined with reflective adhesive tape before the fiber is laid into the groove. The tape holds the adjacent fibers together and maintains the desired curved shape of the array of fiber coil segments after the spiral is removed from the fixture. Alternatively, the groove may be coated with a suitable mold release and the fiber coils secured to one another by epoxy before the coiled fiber strand is removed from the groove.

Assuming that the desired optical illumination substrate corresponds to only a relatively small portion of the entire optical fiber spiral, only a corresponding portion of the fixture is lined with the adhesive tape (or secured by epoxy) and the annulus is cut radially at a location remote from the taped segment, leaving loose fiber ends ("tails") which may be coupled to an appropriate light source.

If the desired optical illumination substrate corresponds to more than an annular segment of the optical fiber spiral, this may be fabricated from two or more smaller segments.

BRIEF DESCRIPTION OF THE DRAWINGS

FIG. 1 shows an automotive speedometer requiring a backlight in the shape of an annular segment;

FIGS. 2, 2A and 2B show a rotatable apparatus for winding a strand of optical fiber to provide an illuminating substrate suitable for the speedometer of FIG. 1, with FIGS. 2A and 2B showing a hinged portion of the apparatus of FIG. 2 in respective unlatched and opened positions;

DETAILED DESCRIPTION OF A PREFERRED EMBODIMENT

FIG. 1 shows the dial D for a typical automotive speedometer. The dial D has an opaque background and is provided with an annular segment of transparent or translucent numbers and indicia. At least under poor ambient light conditions, the dial D is intended to be provided with backlit illumination in order to make the numbers and other indicia clearly visible. The dial D is also provided with three openings through which self contained displays (not shown), such as warning indicators and trip odometers, may be seen.

FIG. 2 shows a rotatable fixture for winding a strand of optical fiber to provide an illuminating substrate suitable for the speedometer dial of FIG. 1. Base plate P is provided with a step S machined into one of its radial surfaces in the vicinity of its periphery, which is just deep enough to define one lateral wall of a groove G into which one layer of optical fiber F can be placed. At least a portion of the step S is of a sufficient depth to also accommodate a pre-cut annular segment of adhesive tape T, to which the fiber adheres when wound into the groove G. This adhesive tape is preferably made of a reflective material and serves as a reflective layer in the completed device, which enhances light output when the fiber ribbon is lit.

A cover C, having a shape complementary to that of the base plate, abuts base plate P, thereby forming a second lateral wall of the peripheral groove G into which the fiber F gets wound. In the illustrated embodiment, groove G has a lateral width slightly greater than the nominal fiber diameter but substantially less than twice the fiber diameter, and a radial depth substantially greater than twice the fiber diameter.

Both the plate P and the cover C have a hole O in the middle, through which they are securely bolted together with bolt assembly B. As shown in FIGS. 2A and 2B, a portion C' of cover plate C is moveable about a hinge H and is held in the closed position by a spring-loaded locking pin L, which normally protrudes into a mating counterbore in the fixed portion of cover plate C. When locking pin L is pulled out of its counterbore, hinged portion C' may be swung open to permit access to the segment of groove G corresponding to the shaped area I, I' (FIGS. 3 and 4) of the optical fiber array.

Figures 3, 3A:
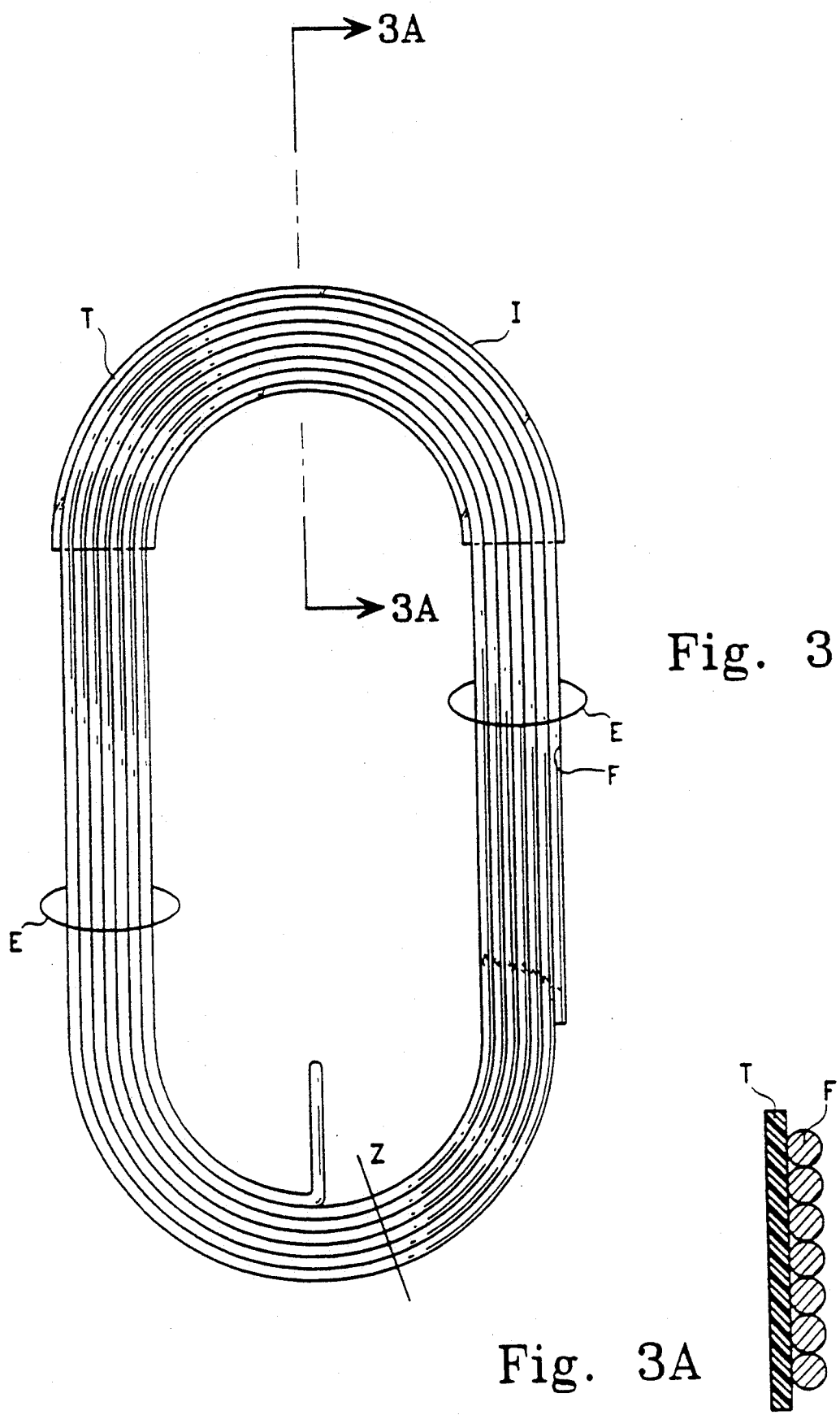
FIGS. 3 and 3A show an oval shaped spiral fiber array formed on the fixture of FIG. 2, with FIG. 3A being a cross-section of FIG. 3 taken along the line 3A—3A.

The fixture of FIG. 2 may be used to fabricate a curved array such as is shown in FIG. 3, as follows:

1. An annular segment of adhesive (reflective) tape(s) T is pre-cut to a shape corresponding to the inner wall of groove G (see area I of FIG. 3).
2. The base plate P and cover C are mated and bolted together by means of bolt assembly B.
3. Locking pin L is pulled outward, allowing the hinged portion C' of cover C to be opened.
4. The pre-cut adhesive tape segment is secured to the wall of groove G.
5. The hinged portion C' is locked and closed.
6. The bolt assembly B is loaded into a rotatable chuck of a winding lathe.
7. One end of a strand of optical fiber is secured in a starting hole at the bottom of groove G.
8. The fixture is slowly rotated to thereby wind the fiber strand F into the grove G. After a predetermined number of revolutions corresponding to the desired width of the array, any fiber extending out of the groove may be cut, preferably at a location Z opposite from the hinged area.
9. The hinged area is opened and the fiber spiral inside the groove is inspected, paying particular care that it is securely held by the adhesive tape T.
10. The bolt assembly B is removed and the base plate P is separated from the cover C.
11. The fiber spiral F (FIG. 3) is cut at location Z remote from curved array I defined by the tape segment T.

The result of the foregoing steps, shown schematically in FIGS. 3 and 3A, is an illumination substrate in the form of an annular segment of closely spaced coils of optical fiber P secured to a reflective backing of adhesive tape T, the non-rectangular shape of which is defined by the profile of groove G in the region of hinge H and from which extends at one or both ends a loose bundle of fibers E. Such a substrate may be processed in conventional fashion (for example, by a heated die or a laser beam) to provide abraded areas, terminations, or other discontinuities at which light will exit from the fibers, and the loose bundle of fibers E may, in conventional fashion, be coupled to one or more sources of light (not shown).

Figure 4:
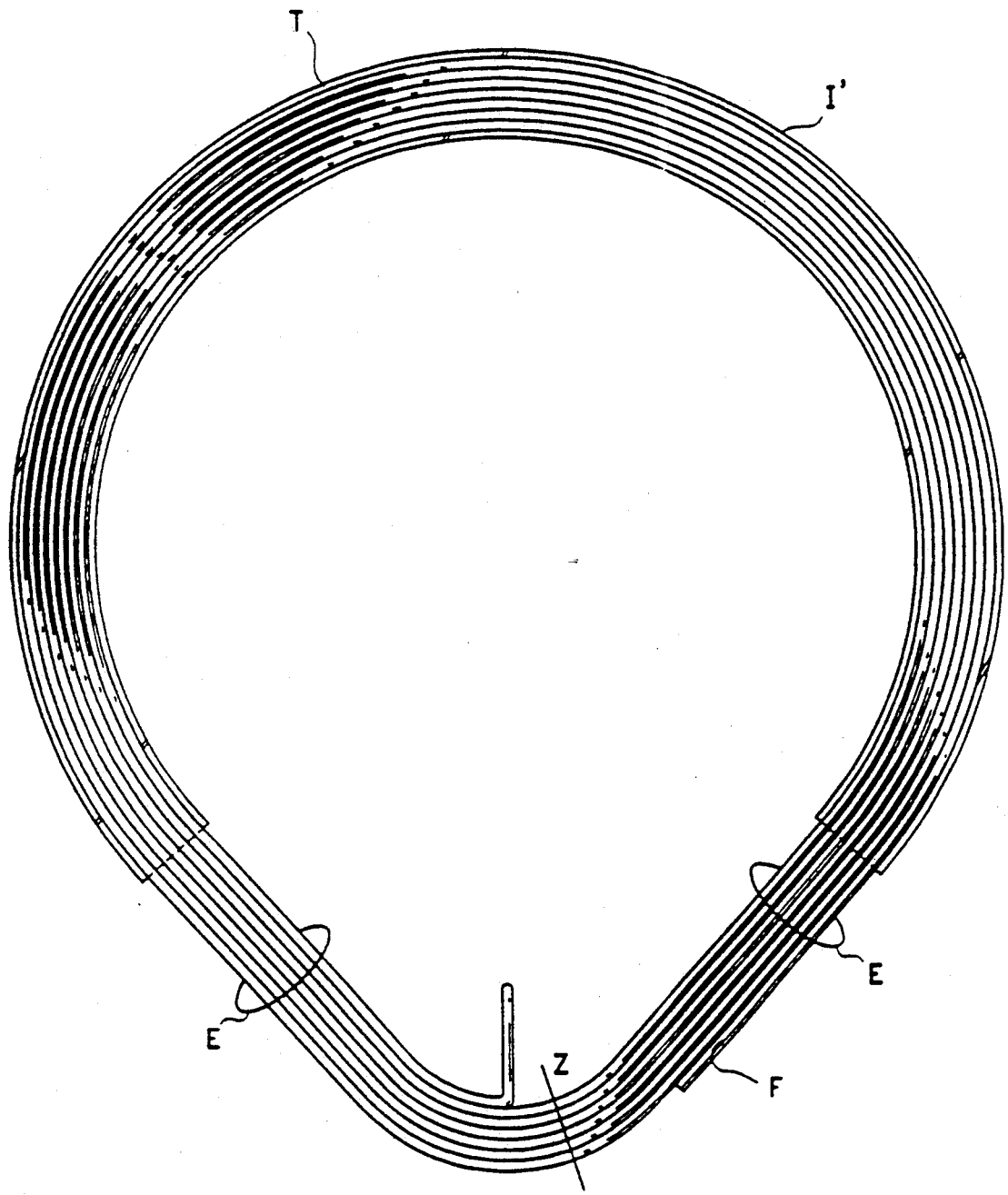
FIG. 4 shows a tear-drop shaped spiral formed on a modified fixture.

It is also possible employ a fixture having a modified peripheral configuration, for example a tear-drop shape as shown in FIG. 4, to fabricate segment I' covering an angle more or less than 180° that is terminated at each end by tangential fiber bundles E. In a similar fashion, by providing a suitable cam-shaped peripheral groove having a non-constant radius relative to the rotational axis of the fixture, non-rectangular substrates having segments of varying radii may be fabricated.

If an entire annulus or other complex shape is required, this may be fabricated from two or more curved segments from each of which tangentially extends, at one or both ends of each segment, a loose bundle of fiber ends leading to a remote light source. Alternatively, one or more loose ends E extending tangentially from the preformed annular segment I, I' may be manually dressed in any desired configuration and secured in that configuration with reflective adhesive tape T.

Although the invention has been described with particular reference to a presently preferred embodiment and modifications thereof, it should be understood that the description is by way of example and not of limitation and the scope of the invention is not intended to be limited only to the described embodiments and modifications. For example, if a substrate comprising a multiple thickness of optical fibers is desired, the width of the groove G should be increased accordingly.

What is claimed is:

1. A method for fabricating an array of optical fibers from a strand of fiber having a predetermined diameter, comprising the steps:

fabricating a winding mandrel with an outwardly opening circumferential groove having a lateral width greater than the fiber diameter and a radial depth substantially greater than twice the fiber diameter;

securing a strand of fiber to a bottom portion of the groove;

winding the fiber strand about the mandrel to form a spiral of coils inside the groove having a predetermined thickness substantially equal to said fiber diameter and a radial width determined by the number of revolutions the strand is wound about the mandrel;

fastening the fiber coils in at least a segment of the spiral to each other to form a fixed array;

opening at least a portion of the mandrel to provide access to the spiral;

removing the spiral from the groove; and cutting the spiral radially to form a loose bundle of individual fibers leading to the fixed array.

2. The method of claim 1, wherein said lateral width is less than twice the fiber diameter.

3. The method of claim 1, wherein said fastening step further comprises:

placing a segment of adhesive tape against an inner wall of the groove prior to winding the fiber strand; and verifying that the fiber strand is attached to the tape segment before removing the spiral.

4. The method of claim 1, wherein said fastening step further comprises:

coating the groove with a mold release before the winding step; and epoxying the fiber coils to one another before the removing step.

5. The method of claim 1, wherein said fabricating step further comprises:

forming an annular step in a plate; and attaching a cover over the plate to define said groove.

6. A fixture for fabricating an array of optical fibers having a predetermined fiber diameter, comprising:

a base plate;

a cover;

means for securing the cover to the base plate to thereby form a mandrel having an axis of rotation passing through the cover and the base plate and an outwardly opening circumferential groove at least partially defined by adjacent surfaces of the base plate and the cover, the groove having a lateral width greater than the fiber diameter but less than twice the predetermined diameter, and a radial depth substantially greater than twice the fiber diameter;

means for temporarily securing one end of a fiber strand to a bottom region of the groove;

means for rotating the mandrel for a predetermined number of revolutions about while the fiber strand is fastened to the groove, to thereby form a spiral having a thickness substantially equal to the fiber diameter and a width determined by the predetermined number of revolutions; and means for providing access to the spiral so that it may be removed from the mandrel.

7. The fixture of claim 6, further comprising:

means for temporarily placing adhesive tape against at least a portion of one sidewall of the groove.

8. The fixture of claim 6, wherein said means for providing access comprises a hinge in said cover for providing access to a annular segment of the groove and a locking pin for securing the cover in a closed position while the fiber is being wound about the mandrel.

9. The fixture of claim 6, wherein the groove extends one full revolution about the outer periphery of the fixture.

* * * * *